July 9, 1929.  H. K. DAVIES ET AL  1,720,643
CHEMICAL CONTAINER
Filed July 15, 1927
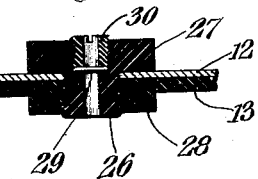
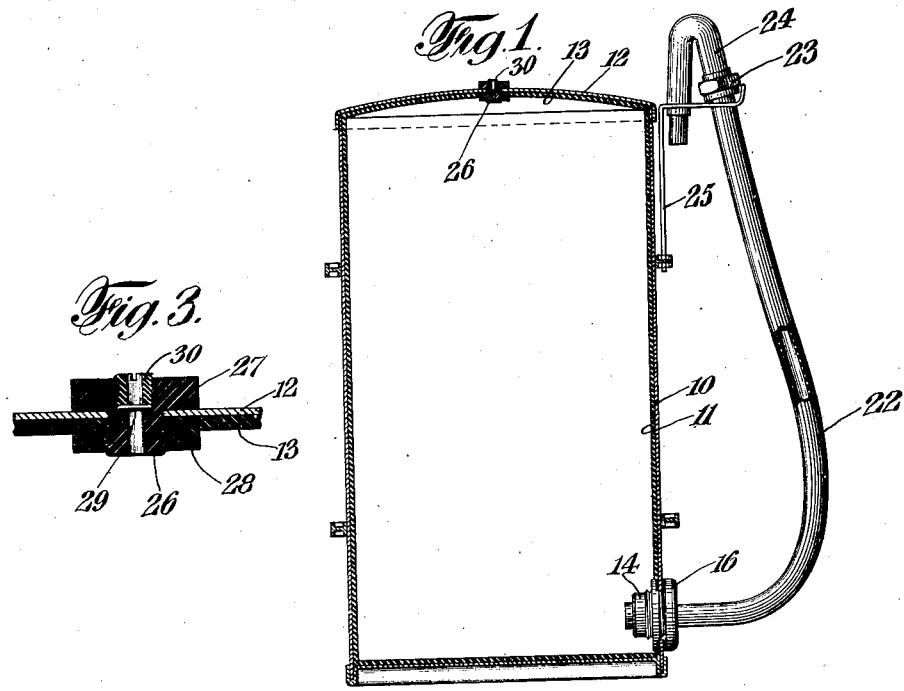
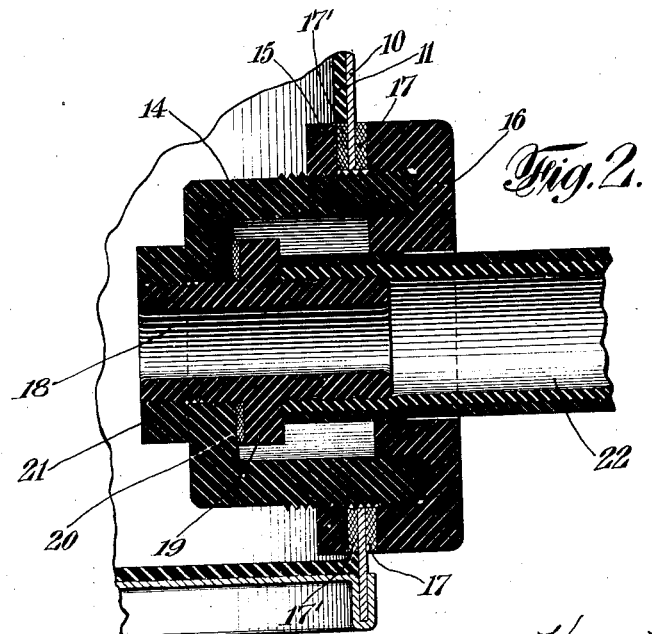

Patented July 9, 1929.

1,720,643

UNITED STATES PATENT OFFICE.

HENRY K. DAVIES, OF BROOKLYN, NEW YORK, AND ADAM C. LORENTZ, OF NORTH BERGEN, NEW JERSEY, ASSIGNORS TO HENRY K. DAVIES & CO., INC., OF NEW YORK, N. Y., A CORPORATION OF NEW YORK.

CHEMICAL CONTAINER.

Application filed July 15, 1927. Serial No. 205,895.

This invention relates to containers and has for its object a container for storing or transporting bleaching agents, such, for example, as sodium hypochlorite. Such chemicals cannot be kept in ordinary metal containers because of the fact that the chemicals attack the metal of which the container is made up. Rubber, however, is not attacked by such chemicals.

According to this invention, the interior of a metal container is lined with a rubber composition known as white rubber which is fixed to the surface of the container by means of a suitable adhesive. In the wall of the container near the bottom therof is provided a hard rubber fitting to which is attached a rubber hose which communicates through the fitting with the interior of the container. The hose comprises an inner layer of white rubber and an outer layer of black rubber, the inner layer being resistive to the chemicals and the outer layer giving to the hose a certain rigidity.

When such container is used merely to store sodium hypochlorite, no cover is provided. In the event that the container is used to transport sodium hypochlorite and is equipped with a cover, a vent is provided in the cover to permit the escape of gas which is developed by the chemical. This vent comprises a pin hole in a piece of white rubber suitably supported in the cover. When the rubber is stretched due to the gas pressure, the pin hole permits gas to escape but will not permit the escape of liquid even though the container may be inverted.

Other objects, novel features and advantages of this invention will be apparent from the following specification and accompanying drawings wherein Figure 1 is a vertical section through a container embodying the invention;

Fig. 2 is an enlarged section of the fitting; and

Fig. 3 is an enlarged detail section of the vent.

10 designates a container formed of steel, iron or the like and to the interior surface thereof is affixed by suitable adhesive or the like a lining 11 of rubber, preferably of the type known as white rubber. A cover 12 is provided for the container and is likewise equipped with a rubber lining 13.

In the lower portion of the container 10 there is provided an aperture within which is arranged a hard rubber fitting. This fitting comprises a cup-shaped member 14 having its base arranged within the container and its rim projecting exteriorly thereof, the diameter of the member 14 being approximately the same as the diameter of the aperture. A collar 15 is threaded on the exterior of the member 14 and contacts with the lining of the container. A cap 16 is also threaded on the member 14 and is arranged exteriorly of the container. Between the cap 16 and the container wall is provided a soft rubber gasket 17. A similar gasket 17' is located between the collar 15 and the container wall. The cup 14 is held in position by the clamping action of the collar 15 and cap 16. A connector 18 extends through an aperture in the bottom of the cup 14 and is provided with a flange 19 between which and the bottom of the cup is provided a soft rubber gasket 20. A collar 21 is threaded on the end of the connector projecting through the cup and holds the connector in place. To the other end of the connector 18 is attached a hose 22. This hose comprises an inner layer of white rubber and an outer layer of black rubber.

The free end of the hose 22 is provided with a union 23 by means of which a short length 24 of white rubber hose is connected to the hose 22. A bracket 25 is mounted on the side of the container 10 for supporting the free end of the hose 22 when not being used to discharge the contents of the container.

An aperture is provided in the cover 12 and within the aperture is arranged the stem 26 of a hard rubber member 27. A hard rubber collar 28 is theaded to the stem 26 and clamps the member 27 in place. The member 27 is provided with a bore, the upper portion of which is of increased diameter to form a recess. In the bottom of the recess is provided a soft rubber disc 29 which is held in place by a tubular hard rubber plug 30 which is threaded into the recess. Pin holes are provided in the disc 29 so that, when stretched under gas pressure within the container, it will permit the escape of gas from the container but prevent the escape of liquid therefrom.

The rubber lining in the container protects the metal of the container from the action of the chemicals therein, so that the latter may be kept within the container as long as desired. The black rubber portion of the hose 22 gives to it the desired strength and rigidity while the inner white rubber lining resists the action of the chemicals. When it is desired to drain the chemicals from the container, the free end of the hose is removed from the bracket 25 and lowered to permit the liquid to drain out under the hydrostatic head of the liquid in the container. The flow of liquid through the hose may be controlled by bending or pinching the portion 24.

Where the container is used merely for storage purposes and not for shipping purposes, the cover 12 may be omitted.

It is apparent, of course, that various modifications may be made without in any way departing from the spirit of the invention as defined in the appended claims.

What we claim as new and desire to secure by Letters Patent of the United States is:

1. A vent for a container comprising a hollow plug adapted to extend through a wall of the container, said plug having a counter-sunk recess, a flexible diaphragm of stretchable material arranged at the bottom of said recess and a tubular member threaded into said recess to hold said diaphragm in position, said diaphragm being provided with pin holes to permit gas to escape therethrough while preventing escape of liquid.

2. A container comprising a body portion, a cover therefor, said cover having an aperture, a plug extending through said aperture and having a head contacting with the exterior of the cover, said plug having a central bore counter-sunk to provide a recess, a locking member threaded on said plug to clamp the latter to said cover, a flexible diaphragm of stretchable material arranged at the bottom of said recess and a tubular member threaded into said recess to hold said diaphragm in position, said diaphragm being provided with pin holes to permit gas to escape therethrough while preventing escape of liquid.

3. A vent for a container comprising a plug adapted to extend through an aperture in said container, said plug having a central bore counter-sunk to provide a recess, a flexible diaphragm of stretchable material arranged at the bottom of said recess, a tubular member threaded into said recess to hold said diaphragm in position, said diaphragm being provided with pin holes to permit gas to escape therethrough while preventing escape of liquid and a locking member threaded on to that portion of the plug which extends within the container.

In testimony whereof, we have signed our names to this specification.

HENRY K. DAVIES.
ADAM C. LORENTZ.